United States Patent
Choi

(10) Patent No.: US 8,965,611 B2
(45) Date of Patent: Feb. 24, 2015

(54) METHOD OF IMPROVING FUEL ECONOMY THROUGH ELECTRIC VEHICLE CONTROL OF A HYBRID VEHICLE HAVING VARIOUS MODES

(75) Inventor: Yong Kak Choi, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 13/480,336

(22) Filed: May 24, 2012

(65) Prior Publication Data

US 2013/0166120 A1 Jun. 27, 2013

(30) Foreign Application Priority Data

Dec. 22, 2011 (KR) ........................ 10-2011-0140250

(51) Int. Cl.
*B60W 20/00* (2006.01)
(52) U.S. Cl.
CPC ....... *B60W 20/00* (2013.01); *B60W 2710/0644* (2013.01)
USPC ........................................ 701/22; 180/65.265
(58) Field of Classification Search
USPC ........ 701/22; 180/65.22, 65.21; 475/5; 477/3
See application file for complete search history.

(56) References Cited

U.S. PATENT DOCUMENTS

| | | | |
|---|---|---|---|
| 7,143,576 B2 * | 12/2006 | Oono | 60/285 |
| 7,448,981 B2 * | 11/2008 | Mashiki | 477/3 |
| 7,699,735 B2 * | 4/2010 | Conlon | 475/5 |
| 7,908,063 B2 * | 3/2011 | Sah | 701/51 |
| 8,414,436 B2 * | 4/2013 | Holmes | 475/5 |
| 2008/0125264 A1 | 5/2008 | Conlon et al. | |
| 2010/0012405 A1 | 1/2010 | Katsuta et al. | |

FOREIGN PATENT DOCUMENTS

| | | |
|---|---|---|
| JP | 2004-340010 A | 12/2004 |
| JP | 2005-225369 A | 8/2005 |
| JP | 2008-143407 A | 6/2008 |
| JP | 2011-98663 A | 5/2011 |
| KR | 10-2007-0082399 A | 8/2007 |
| KR | 10-2011-0062864 A | 6/2011 |

* cited by examiner

*Primary Examiner* — Marthe Marc-Coleman
(74) *Attorney, Agent, or Firm* — Morgan, Lewis & Bockius LLP

(57) ABSTRACT

A method of improving fuel economy through electrical vehicle (EV) control of a hybrid vehicle having various modes includes applying an APS input by releasing a brake, identifying whether a second clutch is released when an input split mode command is applied from a first control unit, determining whether the second clutch is released, generating a target revolutions per minute (RPM) of an engine, comparing the target RPM of the engine with an actual RPM of the engine to generate a first motor torque in response to a difference therebetween through feedback control and feedforward control, applying an injection signal when the RPM of the engine is increased, applying an engine torque according to an engine torque restriction amount of the first control unit to complete a vehicle starting condition, and recognizing completion of vehicle starting when engine torque restriction requirement does not exist.

6 Claims, 13 Drawing Sheets

METHOD OF IMPROVING FUEL ECONOMY THROUGH ELECTRIC VEHICLE CONTROL OF A HYBRID VEHICLE HAVING VARIOUS MODES

CROSS-REFERENCES TO RELATED APPLICATIONS

The present application claims priority of Korean Patent Application Number 10-2011-0140250 filed Dec. 22, 2011, the entire contents of which application is incorporated herein for all purposes by this reference.

BACKGROUND OF INVENTION

1. Field of Invention

The present invention relates to a method of improving fuel economy through electric vehicle (EV) control of a hybrid vehicle having various modes, and more particularly, to a method of improving fuel economy through EV control of a hybrid vehicle having various modes in which fuel economy may be improved by strategically turning on or off the hybrid vehicle in an input split and a compound split.

2. Description of Related Art

Generally, a hybrid vehicle uses not only an engine but also a motor as a power source so that emission of exhaust gas may be reduced and fuel economy may be increased.

The hybrid vehicle may be driven in an electric vehicle (EV) mode that is a purely electric vehicle mode in which only power of a driving motor is used. In the EV mode, power may be generated by the driving motor based the electric power and SOC of a battery. The hybrid vehicle may also be driven in a hybrid electric vehicle (HEV) mode in which power of an engine that generates power by fuel and power of the driving motor are both used as power source. Further, the hybrid vehicle may be driven in a regenerative braking (RB) mode in which braking and inertial energy of the hybrid vehicle is recovered by the driving motor, which generates electricity to be charged in a battery, when the hybrid vehicle is driven by the braking or inertial energy.

The hybrid vehicle has fuel economy including momentary fuel economy that is an amount of fuel consumed when generating power by the power of the engine, the momentary fuel economy being shown as a gauge through a cluster, and accumulative fuel economy that is accumulative fuel amount. When the hybrid vehicle is driven in the EV mode, maximum fuel economy of the battery the hybrid vehicle can output through battery power is displayed through the cluster.

Namely, as shown in FIG. 1, the HEV system described above includes multiple clutches and a brake and can implement various EV types. When the engine is started in a mode corresponding to the input split, the engine is started while only a second brake BK2 is fixed.

The driving mode may be implemented in five driving modes including an input split, a compound split, a fixed gear level one, a fixed gear level two, and a fixed gear level three.

However, in the five driving modes mentioned above, there is a problem in that the EV is available only in the input split mode, and in order to enter the EV in the other modes, the input split mode must be first selected to enter the EV.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in view of the above problems, and the present invention is to provide a method of improving fuel economy through electric vehicle (EV) control of a hybrid vehicle having various modes in which fuel economy may be improved by strategically turning on or off the hybrid vehicle in an input split and a compound split.

According to various aspects of the present invention, a method of improving fuel economy through electrical vehicle (EV) control of a hybrid vehicle having various modes includes applying an APS (Accel Position Sensor) input by releasing a brake, identifying whether a second clutch is released when an input split mode command is applied from a first control unit, determining whether the second clutch is released, generating a target revolutions per minute (RPM) of an engine, comparing the target RPM of the engine with an actual RPM of the engine to generate a first motor torque in response to a difference therebetween through feedback control and feedforward control, applying an injection signal when the RPM of the engine is increased, applying an engine torque according to an engine torque restriction amount of the first control unit to complete a vehicle starting condition, and recognizing completion of vehicle starting when engine torque restriction requirement does not exist.

According to various aspects of the present invention, a method of improving fuel economy through electrical vehicle (EV) control of a hybrid vehicle having various modes includes applying an APS input by releasing a brake, identifying whether a second brake is released when a compound split mode command is applied from a first control unit, determining whether the second brake is released, generating a target revolutions per minute (RPM) of an engine, comparing the target RPM of the engine with an actual RPM of the engine to generate a first motor torque in response to a difference therebetween through feedback control and feedforward control, applying an injection signal when the RPM of the engine is increased, applying an engine torque according to an engine torque restriction amount of the first control unit to complete a vehicle starting condition, and recognizing completion of vehicle starting when engine torque restriction requirement does not exist.

According to various aspects of the present invention, a method of improving fuel economy through electrical vehicle (EV) control of a hybrid vehicle having various modes further includes determining whether an electric vehicle driving mode is canceled based on APS amount when identifying whether the second clutch or the second brake is released.

According to various aspects of the present invention, a method of improving fuel economy through electrical vehicle (EV) control of a hybrid vehicle having various modes further includes setting, by a reaction control of a second motor, a value restricted by a first motor torque amount and a total driving requirement amount of a driver, when generating the first motor torque.

According to various aspects of the present invention, a method of improving fuel economy through electrical vehicle (EV) control of a hybrid vehicle having various modes further includes applying engine torque rise restriction for restricting the engine torque rise as well as applying amount of air restriction and ignition restriction at the same time, when applying the injection signal.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A method of improving fuel economy through electric vehicle (EV) control of a hybrid vehicle having various modes according to the present invention is described with reference to FIGS. 2 through 9.

EV Driving and Regenerative Braking

Figure 1:
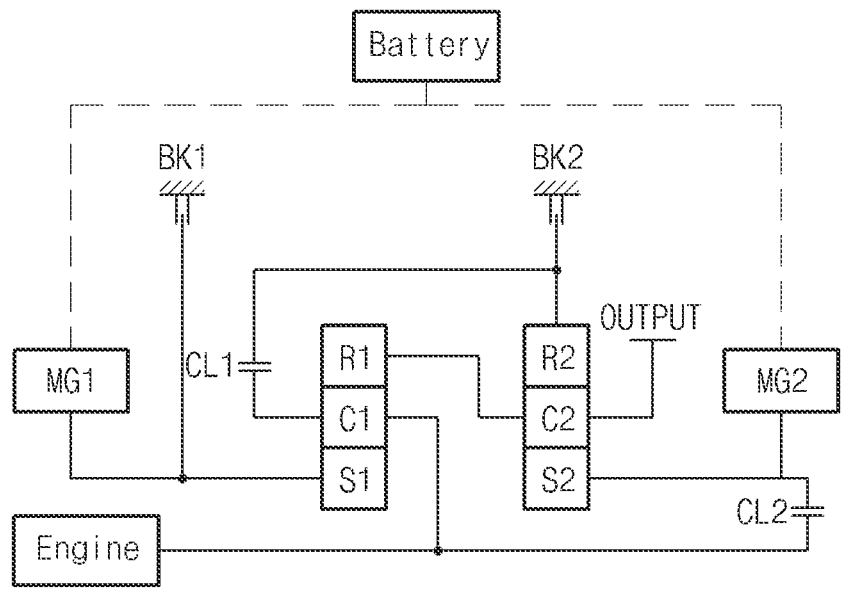
FIG. 1 is a view for explaining electric vehicle (EV) control of a hybrid vehicle in the prior art.
Figure 2:
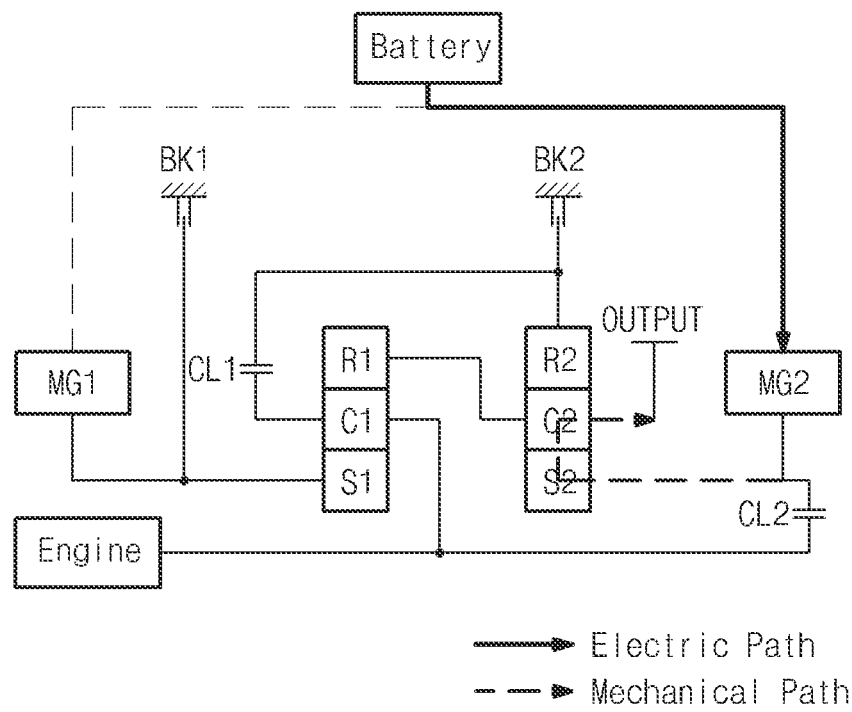
FIG. 2 is a view for explaining an EV driving mode and a regenerative braking mode in the prior art.
Figure 3:
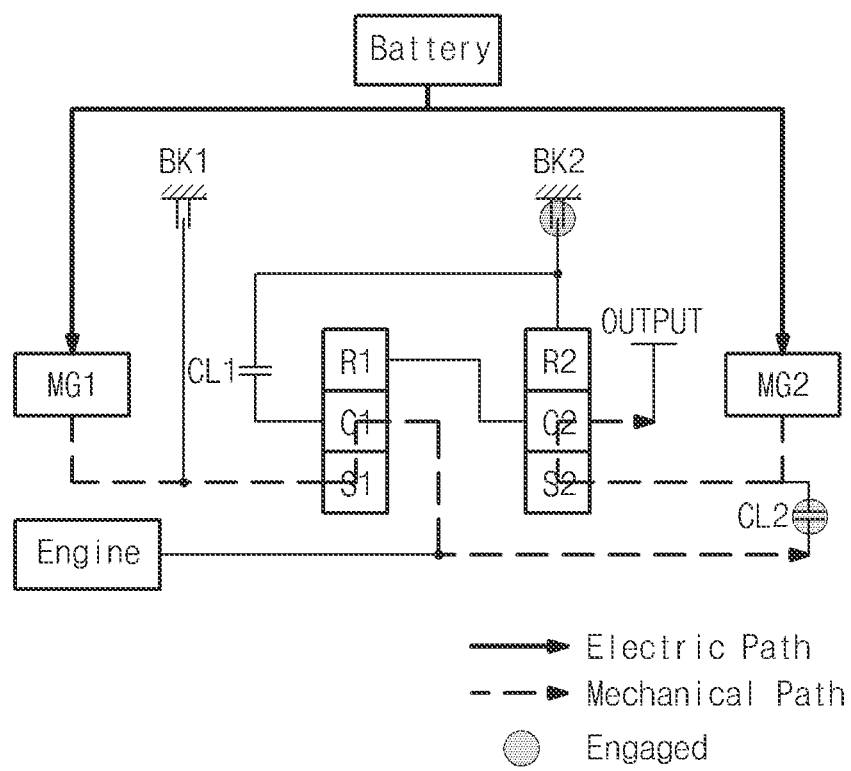
FIG. 3 is a view for explaining an EV driving mode and a regenerative braking mode according to the present invention.

As shown in FIG. 2, when performing a conventional EV control, driving and regenerative braking are performed by using only one motor. However, in the present invention, as shown in FIG. 3, two motors MG1 and MG2 may be used for driving and regenerative braking such that an area having higher efficiency among the two motors MG1 and MG2 may be distributed to increase efficiency in EV driving and regenerative braking.

Also, an EV driving distribution rate between the two motors MG1 and MG2 may be adjusted such that degree of freedom may be increased by configuring the EV to include a first motor MG1, compared with the conventional EV driving mode that uses only a second motor MG2.

Starting the Vehicle

Figure 4:
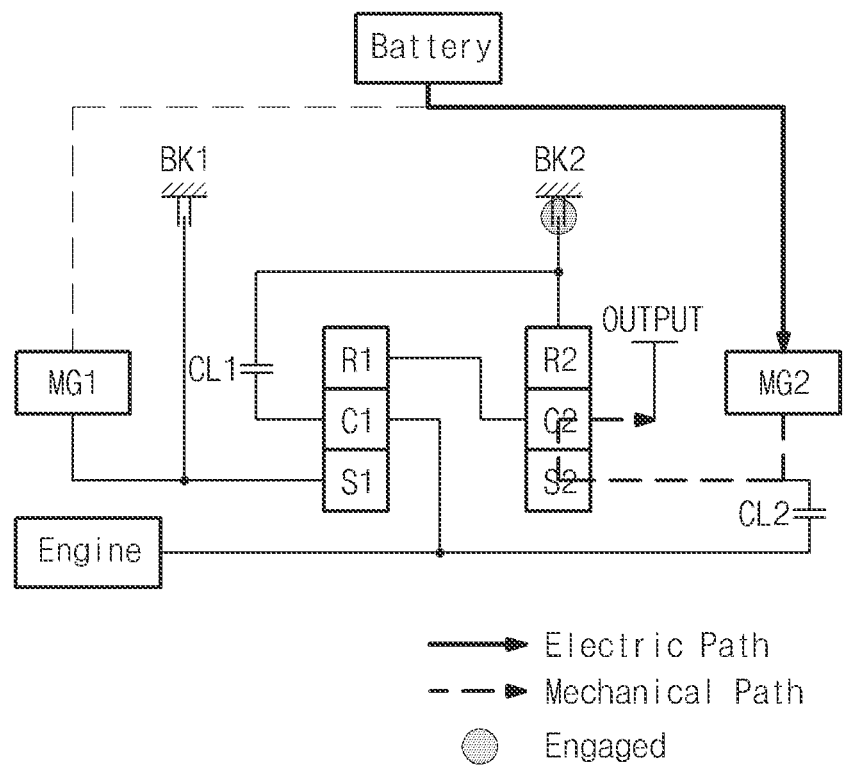
FIG. 4 is a view for explaining a start mode in the prior art.

As shown in FIG. 4, in the prior art, starting the vehicle is enabled by using the first motor MG1. Particularly, in the EV driving mode, the starting of the vehicle is performed when oil input of a brake BK2 that distinguishes a mode is fixed. In other words, an engine is started by using the first motor MG1 under a maneuver condition of the second motor MG2.

Figure 5:
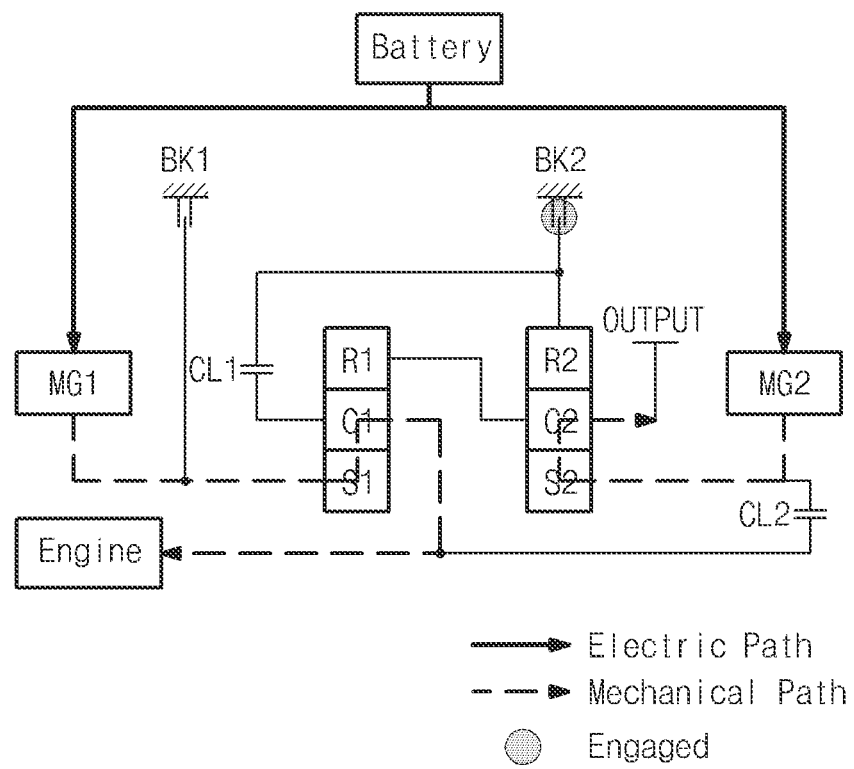
FIG. 5 is a view for explaining a start mode according to the present invention.
Figure 6:
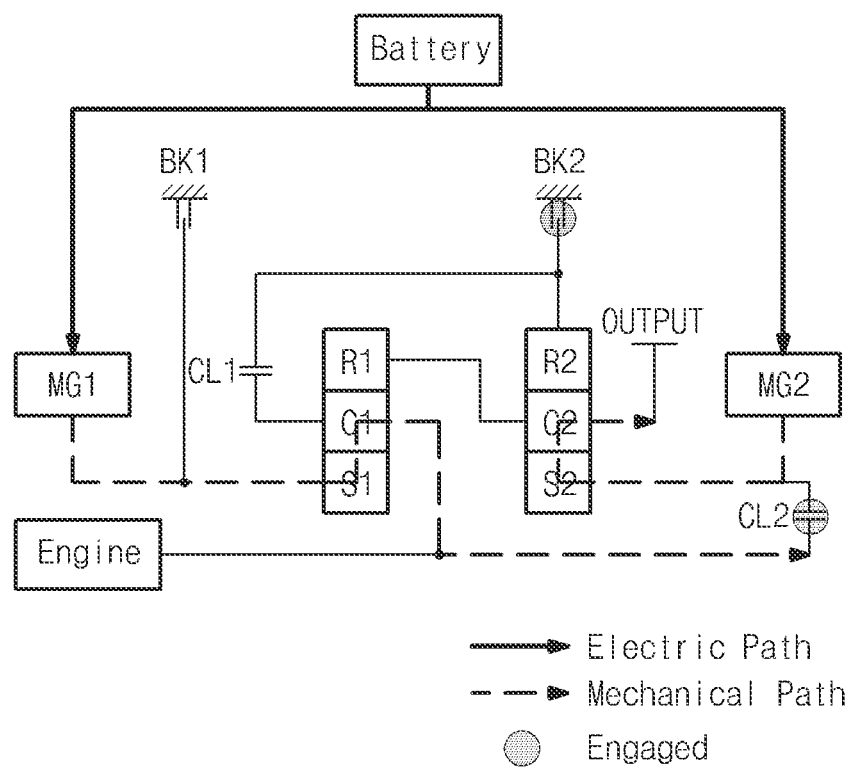
FIGS. 6 and 7 are views for explaining a start mode performed when a brake is fixed in an EV driving mode according to the present invention.
Figure 7:
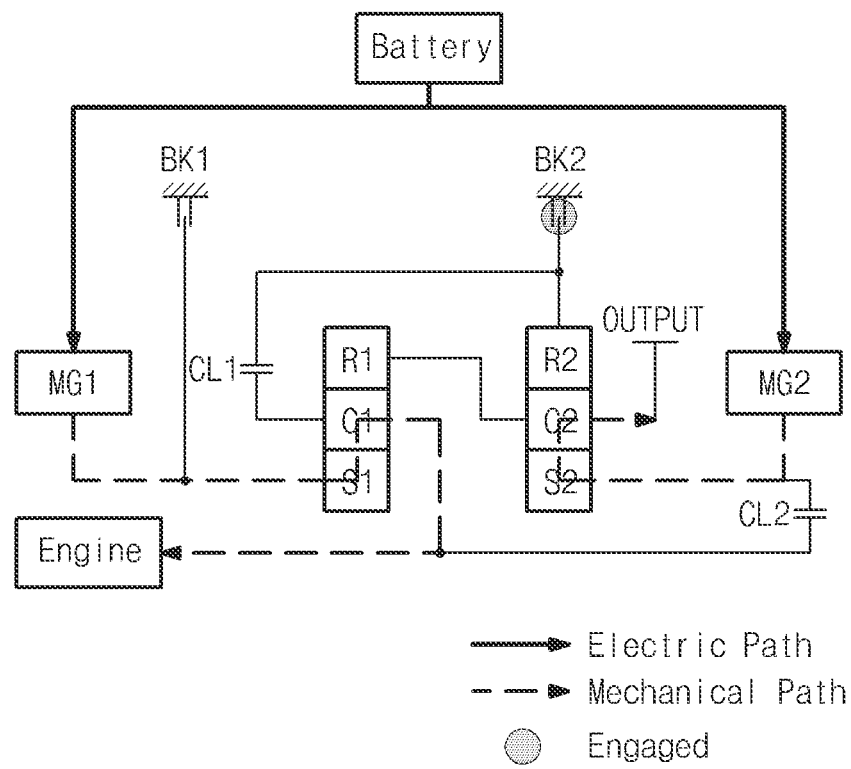

On the other hand, in the present invention, the vehicle may be started in two methods, as shown in FIG. 5. Namely, the vehicle may be started when a second clutch CL2 is released with a second brake BK2 being fixed or started when the second brake BK2 is released with the second clutch CL2 being fixed Starting Mode in which a Clutch is Released while a Brake is Fixed As shown in FIGS. 6 and 7, when a driver releases the clutch CL2 when the brake BK2 is fixed to start the vehicle, the second motor MG2 is driven and a start command is outputted through a hybrid control unit (HCU) such that the second clutch CL2 is released by a transmission control unit (TCU). When release of the second clutch CL2 is completed, a target revolutions per minute (RPM) of the first motor MG1 and a target engine torque of the first motor MG1 are generated to achieve the target RPM and the target engine torque.

Here, since the engine RPM is fixed to 0 due to the release of the second clutch CL2, starting the vehicle cannot be performed by using the first motor MG1 when the second clutch CL2 is unreleased. Further, when starting the vehicle using the first motor MG1, reaction control of the second motor MG2 required for driving condition of the vehicle is needed and the reaction control is related to condition of driving force of the vehicle. In other words, when driving force requirement of the vehicle is greater, the reaction control of the second motor MG2 is relatively lower when starting the first motor MG1, and when driving force requirement of the vehicle is smaller, the reaction control of the second motor MG2 is relatively greater when starting the first motor MG1.

In a driving mode under a compound split mode, the vehicle is driven while the second clutch CL2 is fixed. When the engine RPM is reduced by using the first motor MG1 in a circumstance where fuel is cut such that the engine RPM enters in a range below a certain level, an EV driving mode entering command is transmitted to the transmission control unit TCU and the transmission control unit TCU completes entering the EV driving mode by applying the pressure of the second brake BK2.

Figure 10:
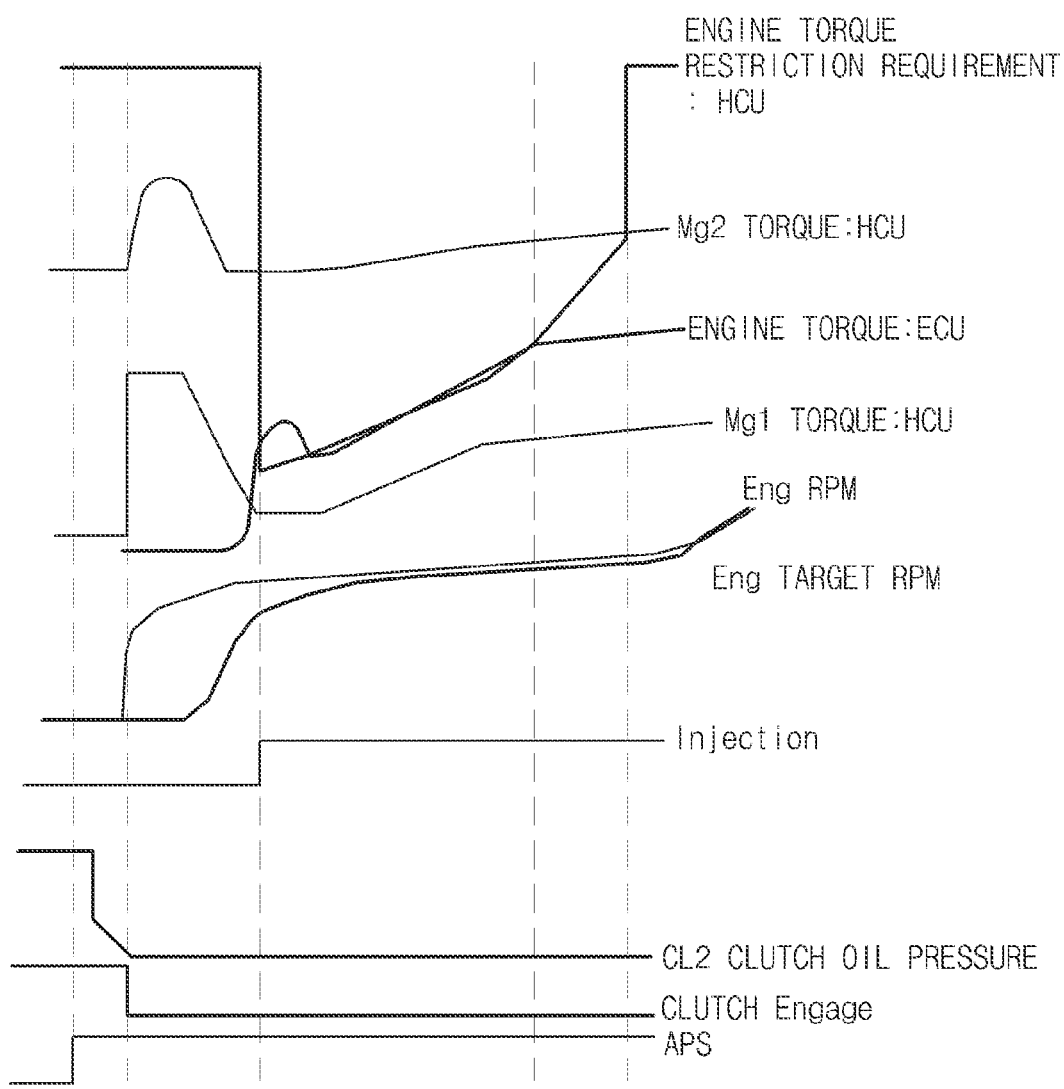
FIG. 10 is a waveform diagram obtained in a start mode performed when a brake is fixed in an EV driving mode according to the present invention.
Figure 11:
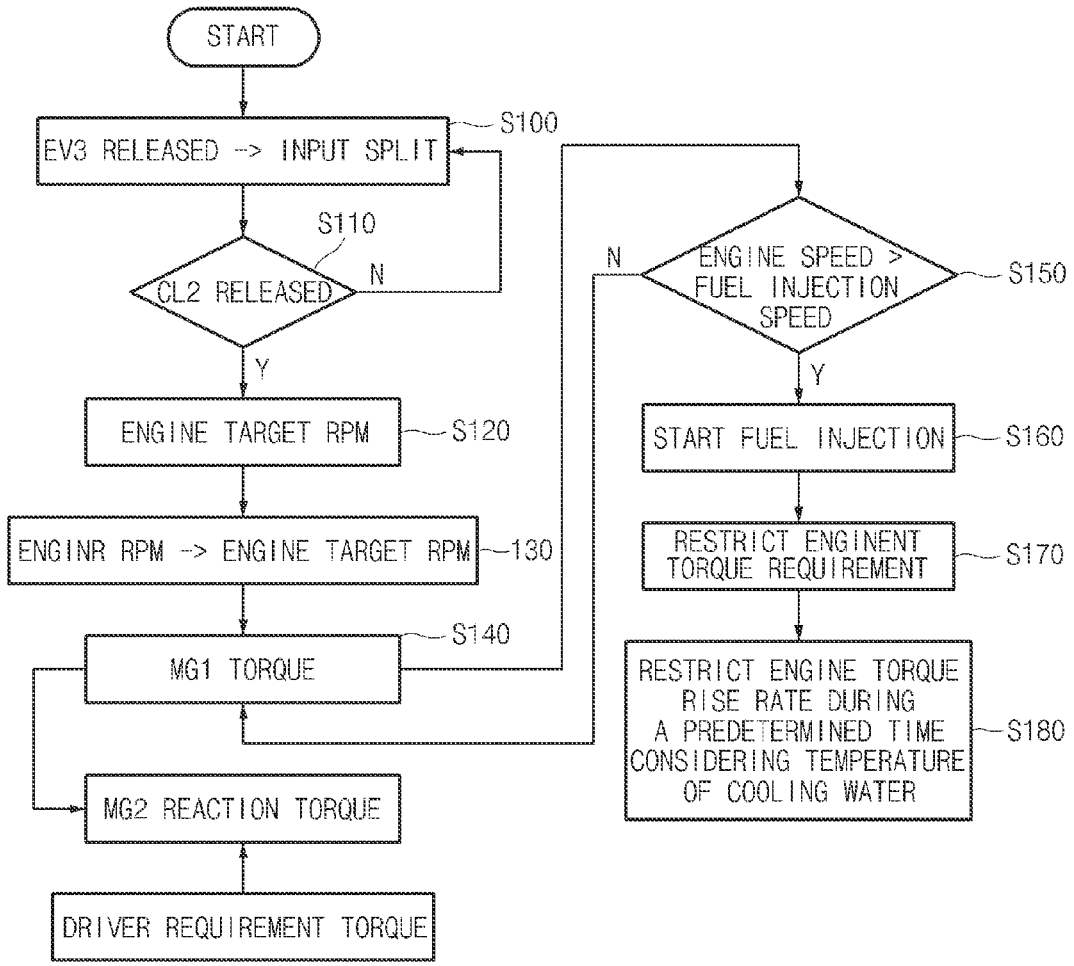
FIG. 11 is a flow chart illustrating a start mode performed when a brake is fixed in an EV driving mode according to the present invention.

Specifically, referring to FIGS. 10 and 11, the brake is first released to apply an APS input and an input split mode command is applied by the hybrid control unit (HCU) (S100), it is determined whether the second clutch CL2 is released (S110). APS (Accel Position Sensor) is represented a demand power of driver.

The target engine RPM is generated (S120), and the target engine RPM is compared with an actual engine RPM (S130) to generate a first motor torque in response to a difference between the target engine RPM and the actual engine RPM through feedback control and feedforward control (S140).

Here, it is determined whether an engine speed is higher than a fuel injection speed (S150) and when the engine speed is determined to be higher than the fuel injection speed, fuel injection is started (S160) and the engine torque requirement is restricted (S170) and an engine torque rise rate is restricted during a predetermined period of time by considering temperature of cooling water (S180).

In other words, when the engine RPM rises, an injection signal is applied and the engine torque is applied according to HCU engine torque restriction. When a vehicle starting condition is completed, vehicle starting is recognized to be completed when the engine torque restriction requirement does not exist.

Whether the EV driving mode is canceled is determined depending on the APS amount and the reaction control of the second motor MG2 is set to a value limited by the torque amount of the first motor MG1 and total driving requirement of the driver. When the injection signal is inputted, engine torque rise restriction for restricting the engine torque rise is applied as well as applying amount of air restriction and ignition restriction at the same time.

Starting Mode in which the Brake is Released while the Clutch is Fixed

Figure 8:
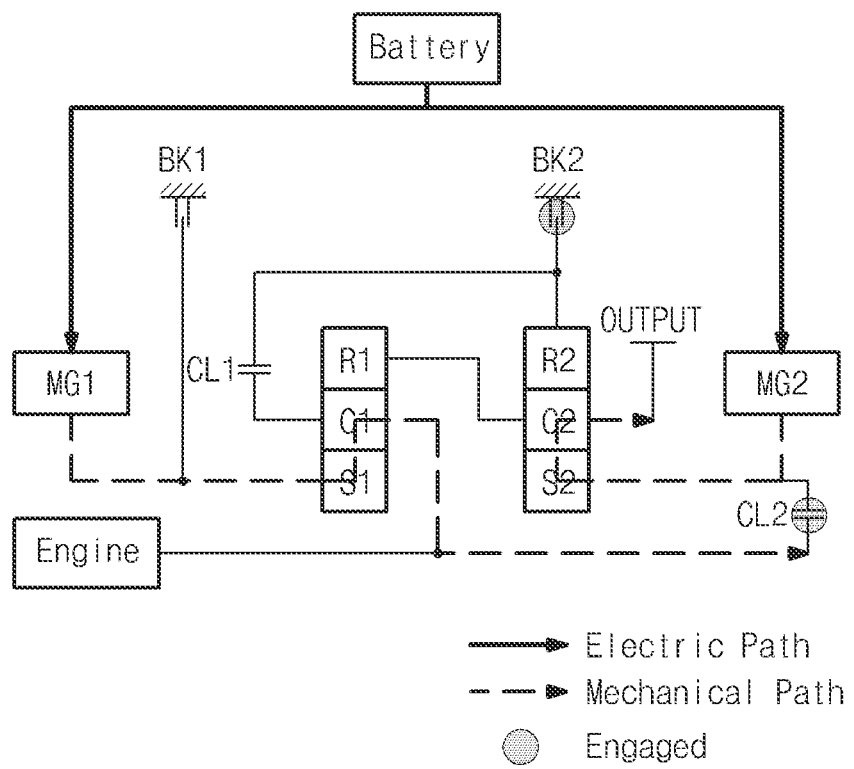
FIGS. 8 and 9 are views for explaining a start mode performed when a clutch is fixed in an EV driving mode according to the present invention.
Figure 9:
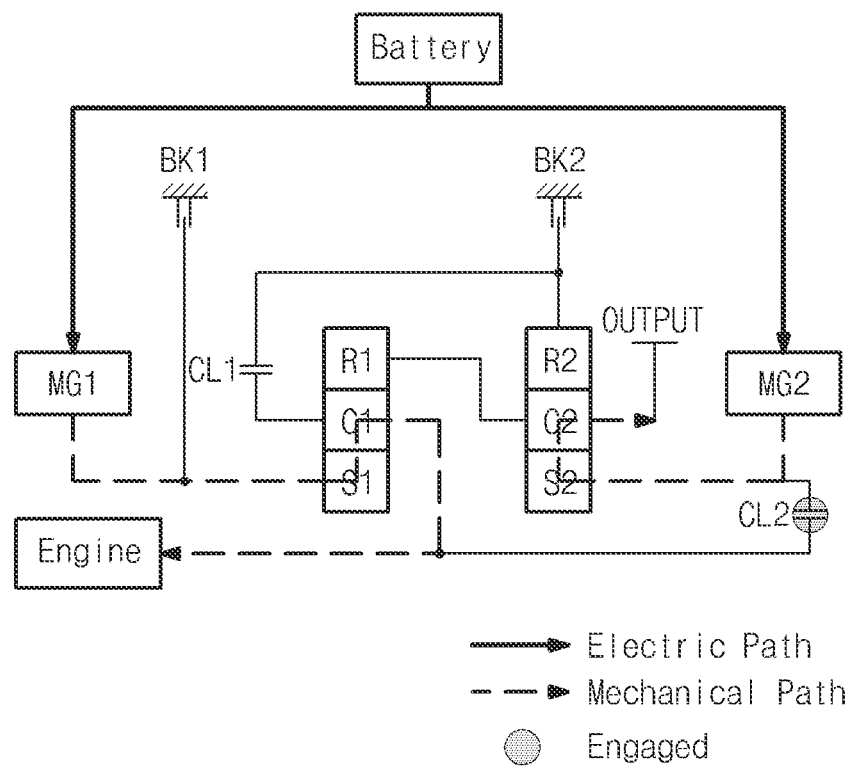

As shown in FIGS. 8 and 9, when the driver releases the brake BK2 with the clutch CL2 being fixed so that the vehicle is started by the second motor MG2 and the start command is outputted through the hybrid control unit (HCU), the brake BK2 is released by the transmission control unit (TCU). When the release of the brake BK2 is completed, the target RPM of the first motor MG1 and the target engine torque of the first motor MG1 are generated to achieve the target RPM and the target engine torque.

Here, since the engine RPM is fixed to 0 due to the release of the second brake BK2, starting the vehicle cannot be performed by using the first motor MG1 when the second brake BK2 is unreleased.

In the driving mode under the input split mode, the vehicle is driven while the brake BK2 is fixed. When the engine RPM is reduced by using the first motor MG1 in a circumstance where fuel is cut such that the engine RPM enters in a range below a certain level, the EV driving mode entering command is transmitted to the transmission control unit (TCU) and the transmission controller TCU completes entering the EV driving mode by applying the pressure of the second clutch CL2.

Figure 12:
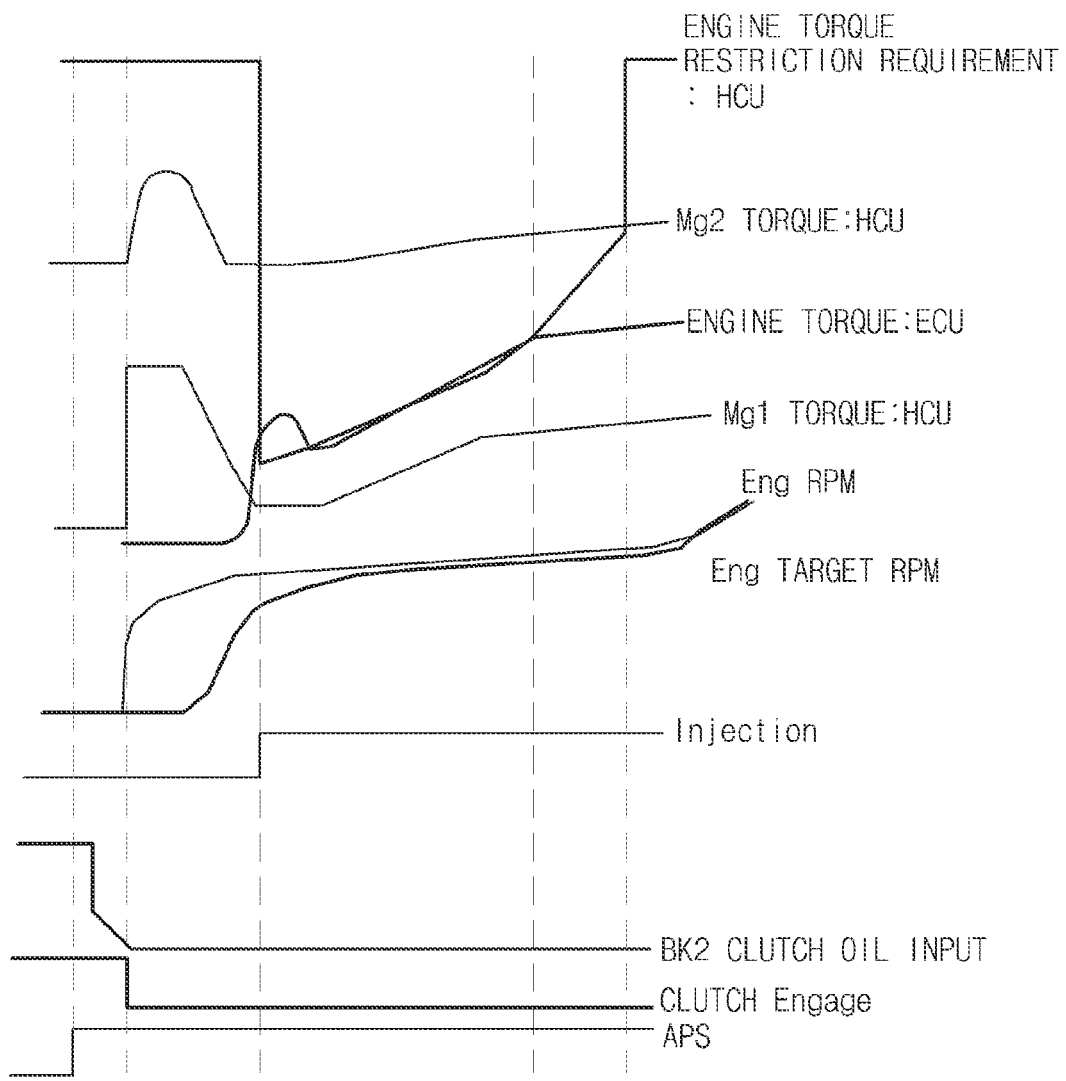
FIG. 12 is a waveform diagram obtained in a start mode performed when a clutch is fixed in an EV driving mode according to the present invention.
Figure 13:
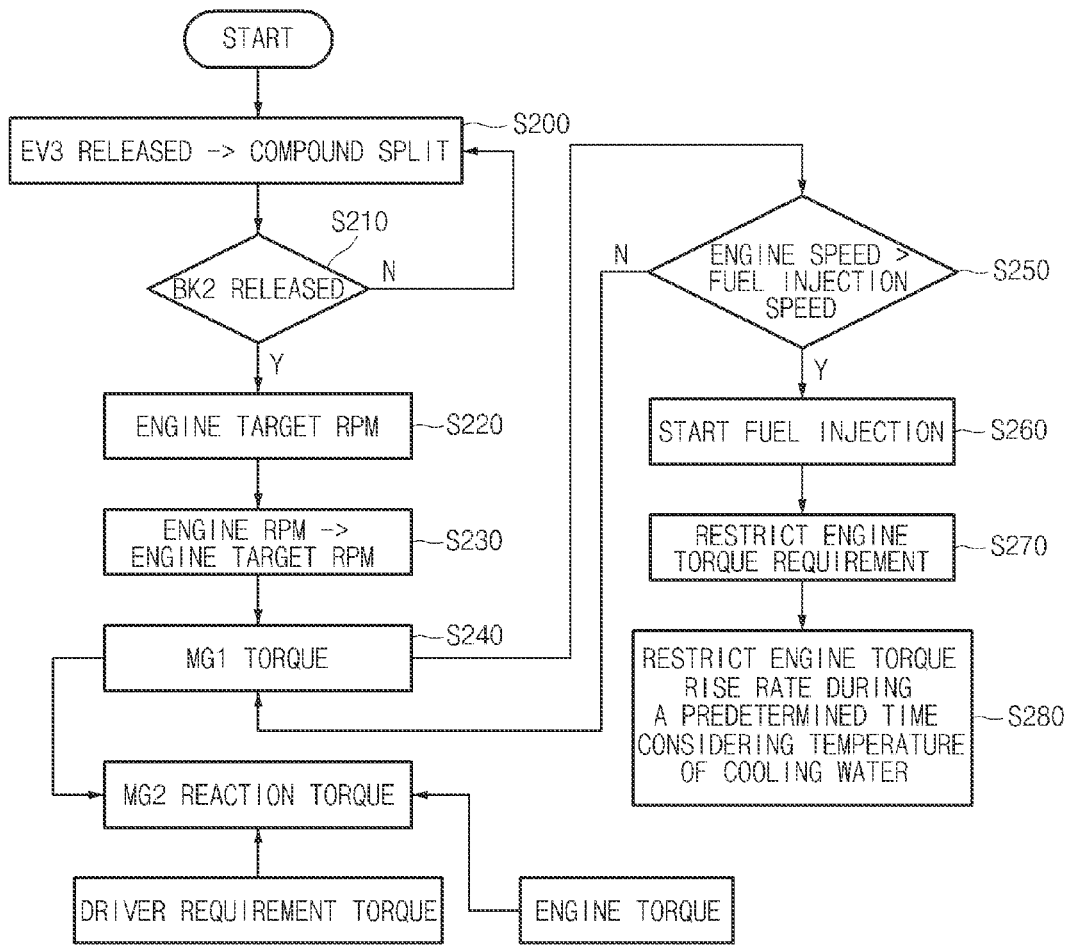
FIG. 13 is a flow chart illustrating a start mode performed when a clutch is fixed in an EV driving mode according to the present invention.

As shown in FIGS. 12 and 13, when the brake is released to apply the APS input such that a compound split mode command is applied by the hybrid control unit (HCU) (S200), it is determined whether the second brake BK2 is released (S210).

The target engine RPM is generated (S220), and the target engine RPM is compared with the actual engine RPM (S230) to generate the first motor torque in response to the difference between the target engine RPM and the actual engine RPM through feedback control and feedforward control (S240).

Here, it is determined whether the engine speed is higher than the fuel injection speed (S250) and when the engine speed is determined to be higher than the fuel injection speed, fuel injection is started (S260) and the engine torque requirement is restricted (S270) and the engine torque rise rate is restricted during a predetermined period of time by considering the temperature of the cooling water (S280).

In other words, when the engine RPM rises, the injection signal is applied and the engine torque is applied according to HCU engine torque restriction. When the vehicle starting condition is completed, vehicle starting is recognized to be completed when the engine torque restriction requirement does not exist.

Whether to cancel the EV driving mode is determined depending on the APS amount and the reaction control of the second motor MG2 is set to a value limited by the torque amount of the first motor MG1 and the total driving requirement of the driver. When the injection signal is inputted, the engine torque rise restriction for restricting the engine torque rise is applied as well as applying amount of air restriction and ignition restriction at the same time.

While the foregoing has been with reference to the hybrid control unit (HCU) and the transmission control unit (TCU), any control unit which can generate the start command/the input split mode command/the compound split mode command or control clutches/brakes can be appreciated as HCU or TCU. The hybrid control unit (HCU) and the transmission control unit (TCU) can be implemented as one control unit.

According to the present invention, fuel economy may be improved by strategically turning on or off the hybrid vehicle in the input split and the compound split as well as improving merchantability and drivability of the hybrid vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of improving fuel economy through electrical vehicle (EV) control of a hybrid vehicle having a starting mode in which a brake is released while a clutch is fixed, wherein the method is executed by a control unit including a hybrid control unit (HCU), the method comprising:
   releasing the clutch by a Transmission Control Unit (TCU) when an input split mode command is applied from the HCU;
   generating a target revolutions per minute (RPM) of an engine by the HCU after releasing the clutch;
   comparing the target RPM of the engine, with an actual RPM of the engine with a target RPM of a first motor;
   determining by the HCU whether a speed of the engine is higher than a fuel injection speed;
   injecting a fuel by the HCU, when the speed of the engine is determined to be higher than the fuel injection speed;
   restricting an engine torque rise rate by the HCU during a predetermined period of time by considering a temperature of a cooling water;
   applying an injection signal to the engine when the RPM of the engine is increased;
   applying an engine torque by the HCU to the engine according to an engine torque restriction amount of the HCU to complete a vehicle starting condition; and
   recognizing completion of vehicle starting by the HCU when engine torque restriction requirement does not exist.

2. The method according to claim 1, further comprising:
   setting, by a reaction control of a second motor, a value restricted by a first motor torque amount and a total driving requirement amount of a driver, when generating the first motor torque.

3. The method according to claim 1, further comprising:
   applying engine torque rise restriction for restricting the engine torque rise as well as applying amount of air restriction and ignition restriction at the same time, when applying the injection signal.

4. A method of improving fuel economy through electrical vehicle (EV) control of a hybrid vehicle having a starting mode in which a clutch is released while a brake is fixed, wherein the method is executed by a control unit including a hybrid control unit (HCU), the method comprising:
    releasing the brake by a Transmission Control Unit (TCU) when a compound split mode command is applied from the HCU;
    generating a target revolutions per minute (RPM) of an engine by the HCU after releasing the brake;
    comparing the target RPM of the engine, with an actual RPM of the engine with a target RPM of a first motor;
    determining by the HCU whether a speed of the engine is higher than a fuel injection speed;
    injecting a fuel by the HCU, when the speed of the engine is determined to be higher than the fuel injection speed;
    restricting an engine torque rise rate by the HCU during a predetermined period of time by considering a temperature of a cooling water;
    applying an injection signal to the engine when the RPM of the engine is increased;
    applying an engine torque by the HCU to the engine according to an engine torque restriction amount of the HCU to complete a vehicle starting condition; and
    recognizing completion of vehicle starting by the HCU when engine torque restriction requirement does not exist.

5. The method according to claim 4, further comprising:
    setting, by a reaction control of a second motor, a value restricted by a first motor torque amount and a total driving requirement amount of a driver, when generating the first motor torque.

6. The method according to claim 4, further comprising:
    applying engine torque rise restriction for restricting the engine torque rise as well as applying amount of air restriction and ignition restriction at the same time, when applying the injection signal.

* * * * *